(12) United States Patent
Zielinski et al.

(10) Patent No.: US 7,927,686 B2
(45) Date of Patent: Apr. 19, 2011

(54) COMPOSITE HEAT SHIELD

(75) Inventors: Edward Zielinski, Kent, WA (US);
Thomas J. Connelly, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 326 days.

(21) Appl. No.: 12/170,789

(22) Filed: Jul. 10, 2008

(65) Prior Publication Data

US 2009/0098321 A1      Apr. 16, 2009

Related U.S. Application Data

(63) Continuation-in-part of application No. 11/870,513, filed on Oct. 11, 2007.

(51) Int. Cl.
| | |
|---|---|
| *B32B 3/00* | (2006.01) |
| *B32B 3/12* | (2006.01) |
| *B64C 1/10* | (2006.01) |
| *B64C 1/00* | (2006.01) |
| *B64D 7/00* | (2006.01) |

(52) U.S. Cl. ......... 428/166; 428/178; 428/34.5; 428/72; 244/121; 244/133

(58) Field of Classification Search ............... 428/166, 428/178, 180, 34.5, 72; 244/121, 133
See application file for complete search history.

(56) References Cited

U.S. PATENT DOCUMENTS

| | | | |
|---|---|---|---|
| 4,767,656 A | 8/1988 | Chee et al. | |
| 5,707,715 A | 1/1998 | deRochemont et al. | |
| 5,804,306 A | 9/1998 | Sorenson et al. | |
| 5,976,997 A | 11/1999 | Meaney et al. | |
| 6,013,361 A | 1/2000 | Seal et al. | |
| 6,025,048 A | 2/2000 | Cutler et al. | |
| 6,521,296 B1 | 2/2003 | Seal et al. | |
| 6,562,436 B2 | 5/2003 | George et al. | |
| 6,673,402 B2 * | 1/2004 | Wildenrotter et al. | ....... 428/34.5 |
| 6,689,488 B2 | 2/2004 | Yoshitome et al. | |
| 6,709,538 B2 | 3/2004 | George et al. | |
| 6,983,912 B2 | 1/2006 | Connelly et al. | |
| 2005/0208338 A1 | 9/2005 | Fernie et al. | |
| 2006/0188696 A1 | 8/2006 | Grose et al. | |
| 2007/0065675 A1 | 3/2007 | Stamm | |

FOREIGN PATENT DOCUMENTS

WO      PCT      9/2008
US2008/076253

OTHER PUBLICATIONS

PCT International Search Report, US2008/076253, The Boeing Company, Issued Apr. 13, 2010.

* cited by examiner

*Primary Examiner* — Jennifer C McNeil
*Assistant Examiner* — Catherine Simone
(74) *Attorney, Agent, or Firm* — Tung & Associates (57) ABSTRACT

A composite heat shield includes a ceramic composite heat shield body comprising a pair of generally spaced-apart heat shield side panels, a heat shield bottom panel extending between the heat shield side panels and having a heat exposure surface, a heat shield top panel extending between the heat shield side panels in spaced-apart relationship with respect to the heat shield bottom panel and having at least one heat shield surface and at least one heat shield cavity defined between the heat shield bottom panel and the heat shield top panel.

21 Claims, 6 Drawing Sheets

COMPOSITE HEAT SHIELD

CROSS-REFERENCE TO RELATED APPLICATIONS

This application is a continuation-in-part of application Ser. No. 11/870,513, filed Oct. 11, 2007 and entitled "Ceramic Heat Shield".

TECHNICAL FIELD OF THE INVENTION

The disclosure relates generally to heat shields. More particularly, the disclosure relates to a composite heat shield and thermal barrier which is suitable for aircraft.

BACKGROUND OF THE INVENTION

Existing aircraft heat shields may be made from titanium, which has an upper temperature limit of about 1100 degrees F. Multiple segments may be built into the titanium heat shield to facilitate thermal expansion and contraction. Aircraft engines may be designed to operate more efficiently by running at idle exhaust temperatures which are higher than the heat capacity of titanium. Therefore, in order to maintain the idle exhaust temperature at a temperature level which is lower than the heat capacity of titanium, the engine may require operation at a higher thrust with a resulting higher fuel consumption level. This may result in an increased level of brake wear. An alternative to the use of titanium would be to use a stainless steel nickel alloy that is capable of handling the higher exhaust temperatures. This may result in an increased weight with a resulting higher fuel consumption level throughout the aircrafts life.

A conventional aft fairing pylon heat shield may be designed with a titanium exhaust plume suppressor with an internal thermal blanket to protect the systems, the diagonal brace and the surrounding aircraft structures from the engine exhaust. The design may require considerable tooling and detailed manufacturing processes to form and assemble the heat shield and the thermal blanket.

Therefore, a heat shield is needed which is simple in construction, is effective in protecting aircraft structures from aircraft engine exhaust and may reduce or eliminate the need for additional heat barriers.

SUMMARY OF THE INVENTION

The present disclosure is generally directed to a composite heat shield. An illustrative embodiment of the heat shield includes a ceramic composite heat shield body comprising a pair of generally spaced-apart heat shield side panels, a heat shield bottom panel extending between the heat shield side panels and having a heat exposure surface, a heat shield top panel extending between the heat shield side panels in spaced-apart relationship with respect to the heat shield bottom panel and having at least one heat shield surface and at least one heat shield cavity defined between the heat shield bottom panel and the heat shield top panel.

BRIEF DESCRIPTION OF THE ILLUSTRATIONS

DETAILED DESCRIPTION

The disclosure is generally directed to a composite matrix ceramic (CMC) heat shield lower surface which may have a heat capacity higher than that of titanium. The ceramic heat shield may provide a one-piece (no segmented gaps) construction which may undergo minimal thermal expansion during aircraft engine thermal cycling and may have a high temperature capacity to thermally isolate structure and systems above the heat shield from engine exhaust on an aircraft. Consequently, an aircraft engine on which the heat shield is assembled may be operated at a lower idle thrust and higher temperature, resulting in decreased fuel consumption and brake wear.

Referring initially to FIGS. 1 and 5-7, an illustrative embodiment of the heat shield is generally indicated by reference numeral 2. The heat shield 2 may include a heat shield panel 3 which may include a wide panel end 5 and a narrow panel end 6 and have a generally elongated, conical shape when viewed from above or below. The heat shield panel 3 may have a generally concave lower surface 3a and a generally convex upper surface 3b. Multiple stiffening ribs 4 may be shaped in the heat shield panel 3 in generally spaced-apart, parallel relationship with respect to each other for structural reinforcing purposes.

Figure 1:
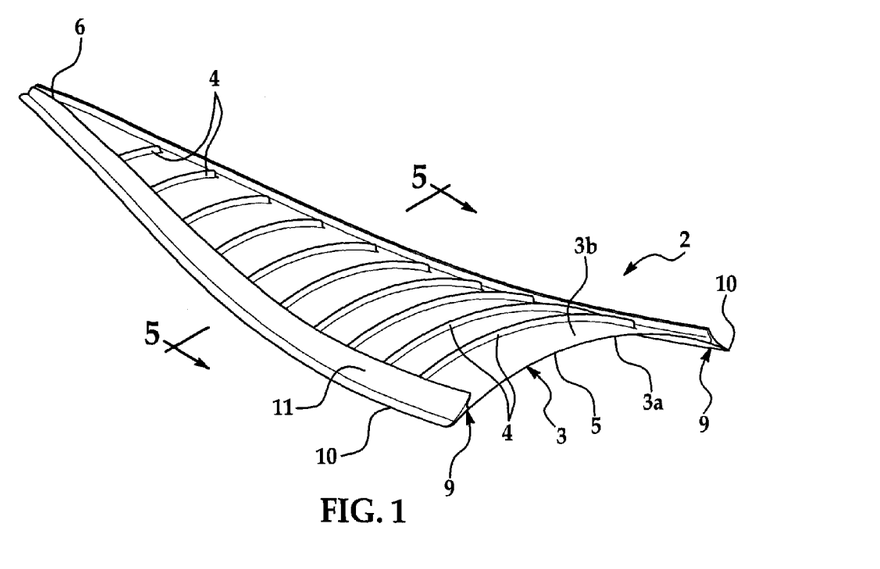
FIG. 1 is a perspective view of an illustrative embodiment of the heat shield.
Figure 5:
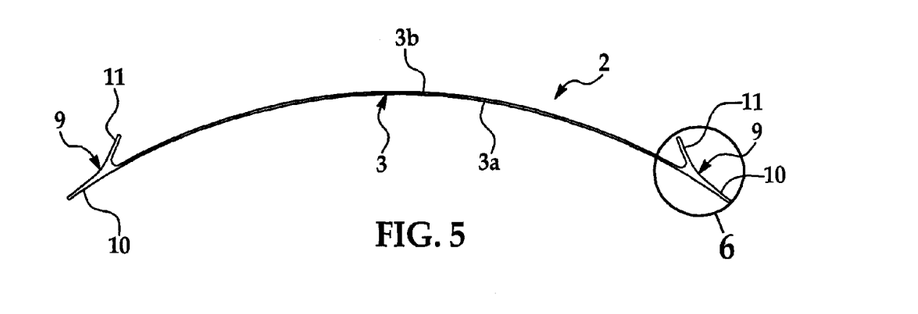
FIG. 5 is a transverse sectional view, taken along section lines 5-5 in FIG. 1, of an illustrative embodiment of the heat shield.
Figure 6:
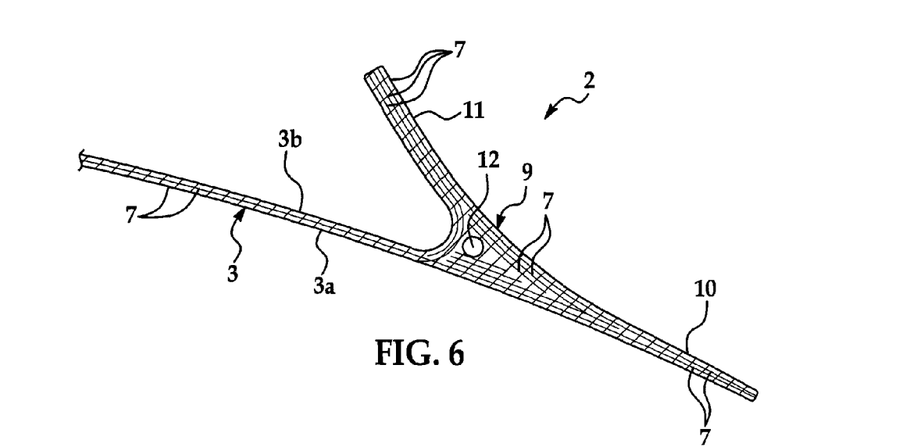
FIG. 6 is an enlarged sectional view, taken along section line 6 in FIG. 5, of an illustrative embodiment of the heat shield.

As shown in FIGS. 5 and 6, thickened panel edge portions 9 may be provided in the opposite longitudinal edges of the heat shield panel 3. A panel side flange 10 may extend outwardly from each panel edge portion 9. A side skin attachment flange 11 may extend from each panel edge portion 9 at a generally acute angle with respect to the heat shield panel 3. Therefore, each panel edge portion 9 may define the junction between the heat shield panel 3; each side flange 10; and the corresponding side skin attachment flange 11. As shown in FIG. 1, the panel edge portions 9 and side skin attachment flanges 11 may converge and meet at the narrow panel end 6 of the heat shield panel 3.

Figure 7:
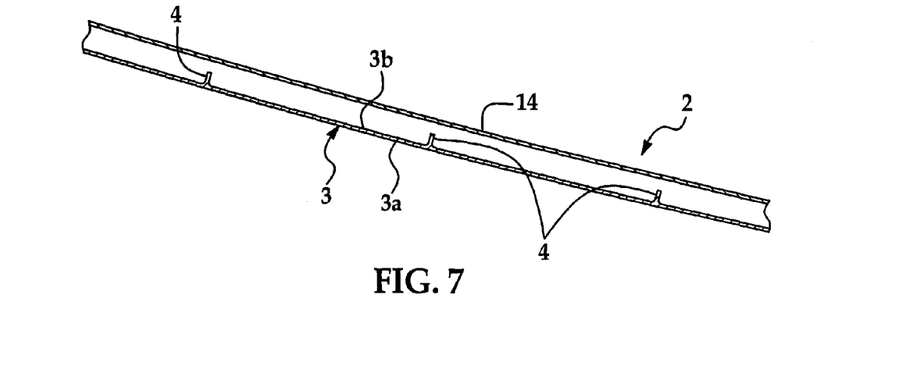
FIG. 7 is a longitudinal sectional view of an alternative illustrative embodiment of the heat shield.

The heat shield panel 3 and each panel edge portion 9, side flange 10 and side skin attachment flange 11 may be a ceramic composite material having a high temperature capacity such as composite matrix ceramic (CMC), for example and without limitation. As shown in FIG. 6, the heat shield panel 3 and each side flange 10 and each side skin attachment flange 11 may include multiple laminated CMC plies 7. A radius filler or "noodle" 12 may fill the interface between the plies 7 at the joint between the heat shield panel 3, each side flange 10 and the corresponding side skin attachment flange 11 in each panel edge portion 9, as is known to those skilled in the art. As shown in FIG. 7, in some embodiments an insulation coating 14 may be provided on the heat shield panel 3 and may additionally be provided on the panel side portions 9, shown in FIG. 6, side flanges 10 and side skin attachment flanges 11 of the heat shield 2.

Figure 2:
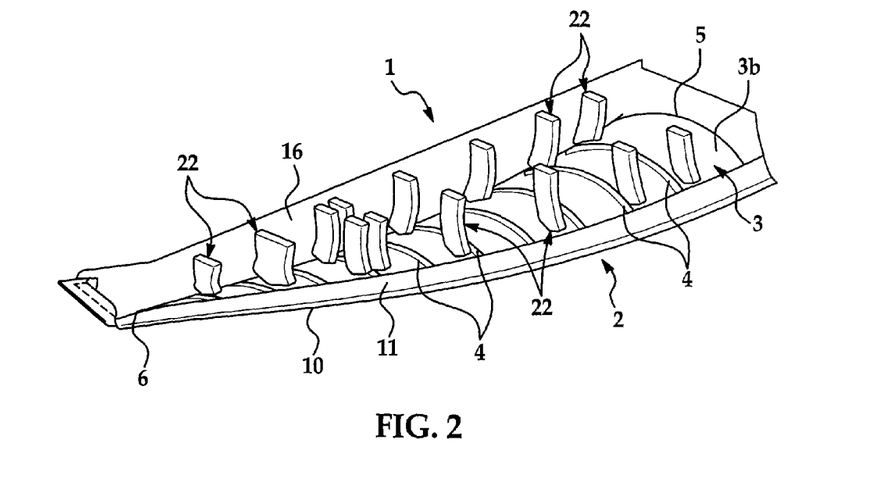
FIG. 2 is a perspective view of a heat shield assembly which includes an illustrative embodiment of the heat shield and side skins (one of which is shown) attached to the heat shield assembly.
Figure 3:
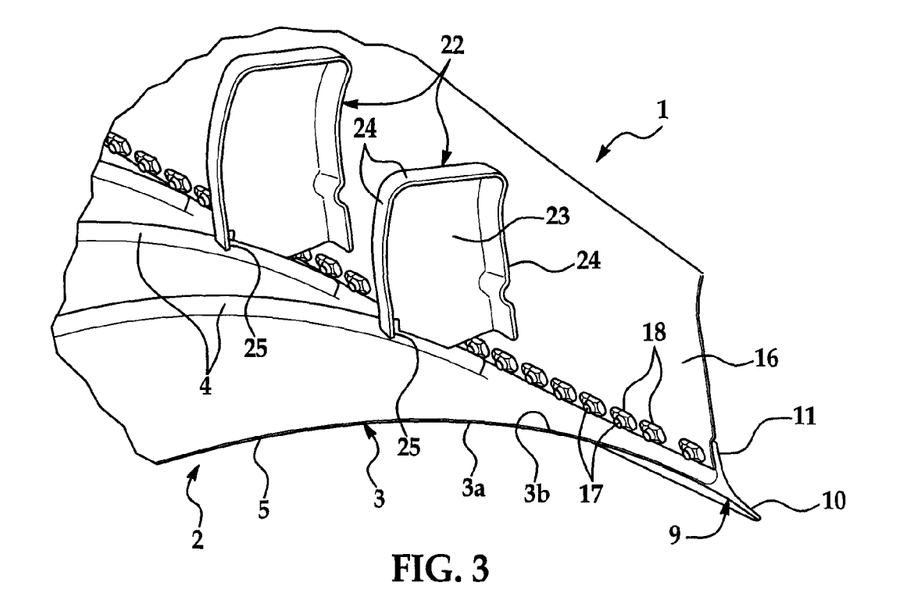
FIG. 3 is an enlarged sectional perspective view, illustrating a pair of nut plates attaching a side skin to an illustrative embodiment of the heat shield in a heat shield assembly.
Figure 4:
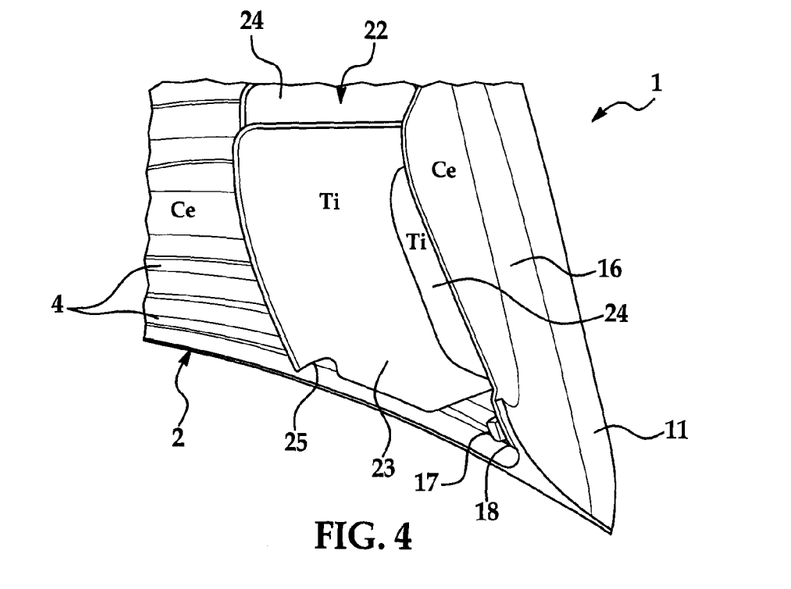
FIG. 4 is a sectional view of an illustrative embodiment of the heat shield, more particularly detailing attachment of each nut plate to a side skin in the heat shield assembly.

Referring next to FIGS. 2-4 of the drawings, the heat shield 2 may be a part of a heat shield assembly 1. In the heat shield assembly 1, a side skin 16 may be attached to each side skin attachment flange 11 of the heat shield 2. Each side skin 16 may be diffusion-bonded SPF (superplastic forming) titanium, for example and without limitation and may be a continuous piece having no split line. Each side skin 16 may be attached to the corresponding side skin attachment flange 11 according to any suitable technique which is known to those skilled in the art. As shown in FIG. 3, in some embodiments multiple side skin fasteners 17 may extend through respective registering pairs of fastener openings (not shown) provided in the side skin attachment flange 11 and the side skin 16, respectively. Securing nuts 18 may be provided on the respective side skin fasteners 17 and threaded against the interior surface of the side skin 16.

As further shown in FIGS. 2-4, in some embodiments a nut plate 22 is attached to each stiffening rib 4 in the heat shield panel 3 and to the side skin 16. Each nut plate 22 may be titanium, for example and without limitation and may include a generally rectangular nut plate panel 23. A reinforcing lip 24 may extend from one or multiple edges of the nut plate panel 23. A rib notch 25 may be provided in the reinforcing lip 24 to receive and engage the stiffening rib 4 in a snap-fit.

In typical application of the heat shield 2, the heat shield panel 3 of the heat shield assembly 1 is attached to an aft pylon fairing (not shown) and wing structure (not shown) on a jet passenger aircraft according to the knowledge of those skilled in the art. In operation of the aircraft, exhaust gases (not shown) from the jet engine contact the generally concave lower surface 3a of the heat shield panel 3, which thermally insulates structures and systems (not shown) above the heat shield assembly 1 from the heat. Because the heat shield panel 3 may be capable of withstanding temperatures which are higher than the temperature capacity of titanium, the jet engine may be operated at a lower idle thrust and higher temperature, resulting in decreased fuel consumption and aircraft brake wear. Furthermore, because it may undergo minimal thermal expansion and contraction during thermal cycling of the jet engine, the heat shield 2 may be constructed in one piece as was noted hereinabove. Consequently, the jet engine can be designed with thermal cycles which are not limited by material restrictions.

Figure 8:
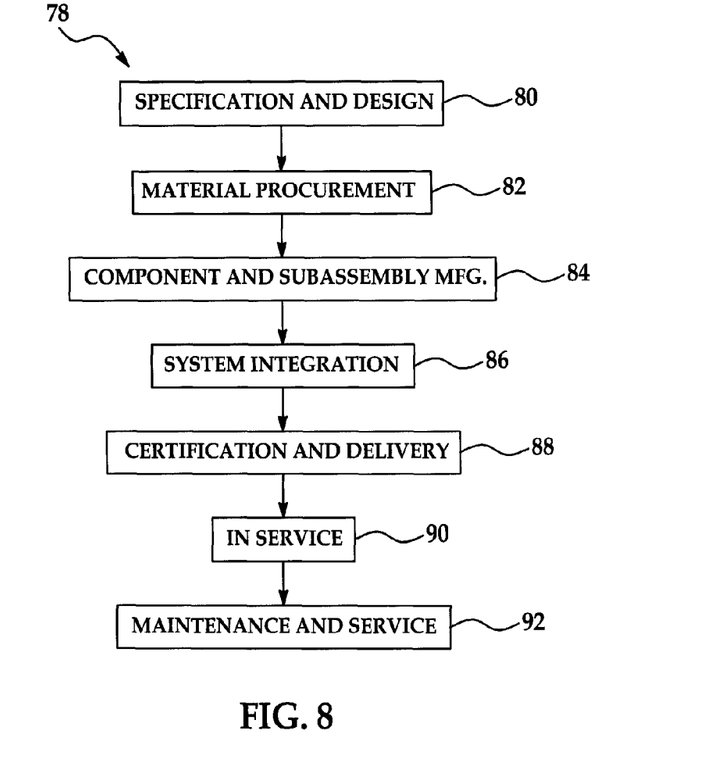
FIG. 8 is a flow diagram of an aircraft production and service methodology.
Figure 9:
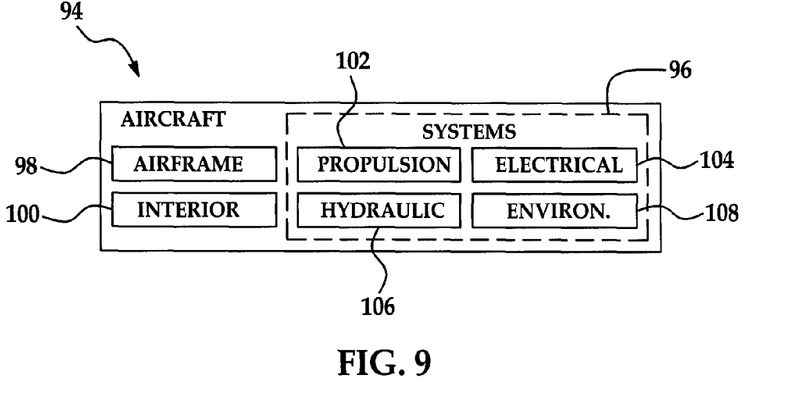
FIG. 9 is a block diagram of an aircraft.
Figure 10:
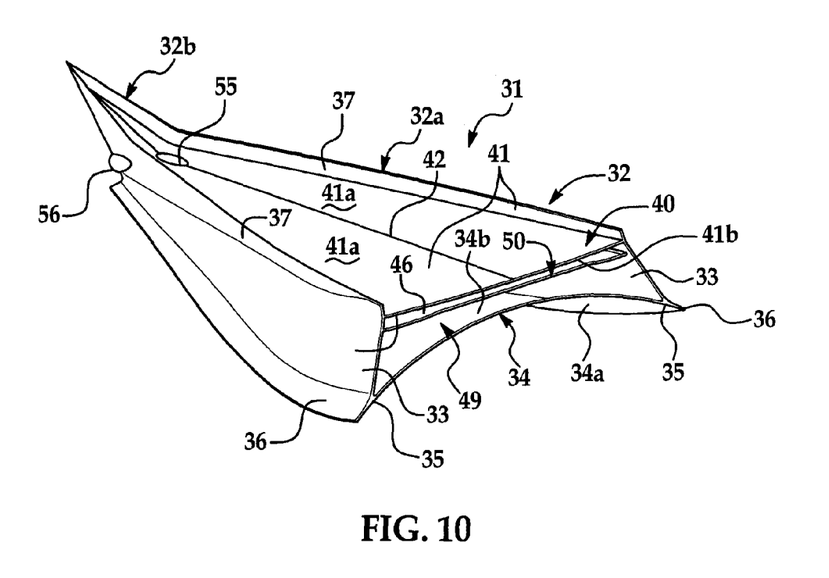
FIG. 10 is a top perspective view of an alternative illustrative embodiment of the heat shield.
Figure 11:
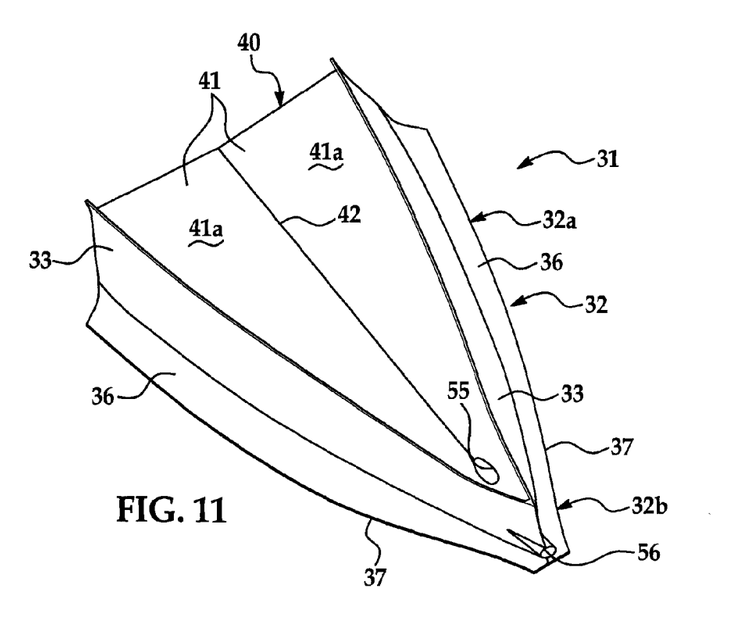
FIG. 11 is a bottom perspective view of the illustrative embodiment of the heat shield shown in FIG. 10.
Figure 12:
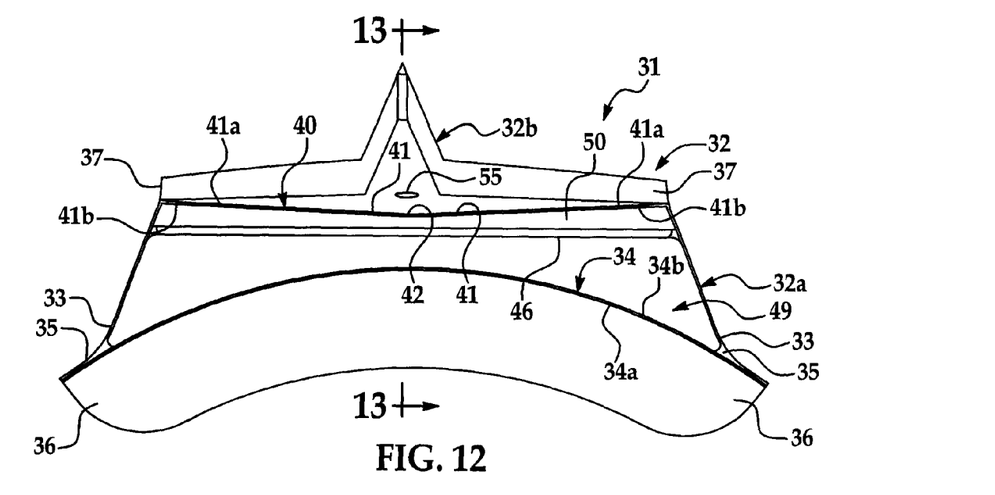
FIG. 12 is a front view of the illustrative embodiment of the heat shield shown in FIG. 10.

Referring next to FIGS. 8 and 9, embodiments of the disclosure may be used in the context of an aircraft manufacturing and service method 78 as shown in FIG. 8 and an aircraft 94 as shown in FIG. 9. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Figure 13:
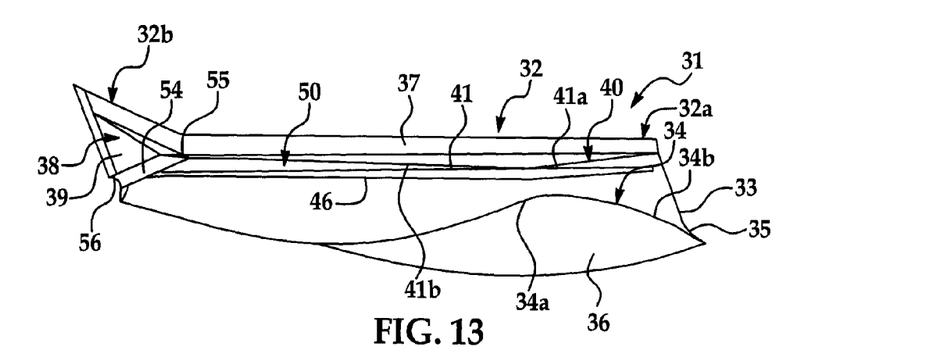
FIG. 13 is a longitudinal sectional view, taken along section lines 13-13 in FIG. 12, of the heat shield.

Referring next to FIGS. 10-13, an alternative illustrative embodiment of the heat shield is generally indicated by reference numeral 31. The heat shield 31 may include a generally elongated, conical-shaped heat shield body 32 which may include a main body portion 32a and a tapered body portion 32b which extends from the main body portion 32a. The main body portion 32a and the tapered body portion 32b of the heat shield body 32 may have a monolithic composite construction, for example and without limitation. As shown in FIG. 13, a core cavity 38 may be provided in the tapered body portion 32b. A core 39, which may be a foam material, for example and without limitation, may be provided in the core cavity 38.

The heat shield body 32 of the heat shield 31 may include a pair of spaced-apart heat shield side panels 33. A heat shield bottom panel 34, which may have a generally curved configuration, may extend between the heat shield side panels 33. The heat shield bottom panel 34 may be attached to the heat shield side panels 33 at respective panel junctions 35. Side flanges 36 may extend outwardly from the respective panel junctions 35. The heat shield bottom panel 34 may have a generally concave heat exposure surface 34a and a generally convex interior surface 34b.

A heat shield top panel 40 may extend between the heat shield side panels 33 in spaced-apart relationship with respect to the heat shield bottom panel 34. The heat shield top panel 40 may include a pair of top panel sections 41 which are joined longitudinally to each other along a top panel center line 42. The top panel sections 41 of the heat shield top panel 40 may have a pair of respective heat shield surfaces 41a disposed at a generally obtuse angle or sloped position with respect to each other and a pair of interior surfaces 41b which are opposite the respective heat shield surfaces 41a. Upper flanges 37 may extend from the respective heat shield side panels 33, beyond the plane of the heat shield surfaces 41a of the respective top panel sections 41.

A heat shield partition 46 may extend between the heat shield side panels 33 of the heat shield body 32 and may be generally disposed between the heat shield bottom panel 34 and the heat shield top panel 40. A lower heat shield cavity 49 may be defined between the heat shield partition 46 and the heat shield top panel 40. An upper heat shield cavity 50 may be defined between the heat shield partition 46 and the heat shield bottom panel 34. The lower heat shield cavity 49 and the upper heat shield cavity 50 may thermally insulate the heat shield surfaces 41a on the respective top panel sections 41 of the heat shield top panel 40 from the heat exposure surface 34a on the heat shield bottom panel 34.

As shown in FIG. 13, a drain inlet opening 55 may be provided in the heat shield top panel 40 at the tapered body portion 32b of the heat shield body 32. A drain outlet opening 56 may be provided in the heat shield bottom panel 34 at the tapered body portion 32b. A drain conduit 54 may extend through the tapered body portion 32b and establish communication between the drain inlet opening 55 and the drain outlet opening 56.

In typical application of the heat shield 31, the heat shield body 32 may be attached to an aft pylon fairing (not shown) and wing structure (not shown) on a jet passenger aircraft according to the knowledge of those skilled in the art. In operation of the aircraft, exhaust gases (not shown) from the jet engine contact the generally concave heat exposure surface 34a of the heat shield bottom panel 34, which thermally insulates structures and systems (not shown) above the heat shield 31 from the heat. The lower heat shield cavity 49 and the upper heat shield cavity 50 may further thermally insulate the structures and systems from the heat. Because the heat shield 31 may be capable of withstanding temperatures which are higher than the temperature capacity of titanium, the jet engine may be operated at a lower idle thrust and higher temperature, resulting in decreased fuel consumption and aircraft brake wear. Furthermore, because it may undergo minimal thermal expansion and contraction during thermal cycling of the jet engine, the heat shield 31 may be constructed in one piece as was noted hereinabove. Consequently, the jet engine can be designed with thermal cycles which are not limited by material restrictions. Liquid (not shown) which collects on the heat shield top panel 40 may be drained from the heat shield surfaces 41a of the respective top panel sections 41 through the drain conduit 54 (FIG. 13).

Figure 14:
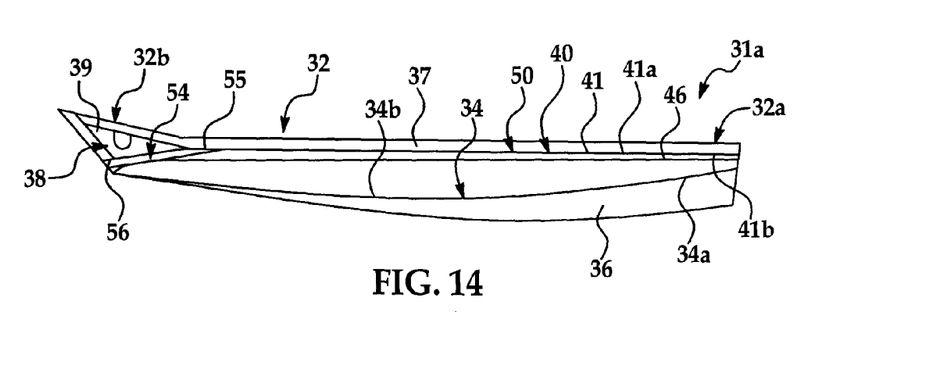
FIG. 14 is a longitudinal sectional view of an alternative illustrative embodiment of the heat shield.

Referring next to FIG. 14, an alternative illustrative embodiment of the heat shield is generally indicated by reference numeral 31a. The heat shield 31a has a more attenuated or less curved heat exposure surface 34a as compared to the heat exposure surface 34a of the heat shield 31 which was heretofore described with respect to FIGS. 10-13. This results in a lower volume of the lower heat shield cavity 49 as compared to that of the heat shield 31. Therefore, the curvature of the heat exposure surface 34a and volume of the lower heat shield cavity 49 may be selected depending on the thermal insulation requirements as dictated by airplane exhaust and engine fan flow characteristics.

It will be appreciated by those skilled in the art that the simplicity of construction of the heat shield 31 may reduce the part count of the heat shield 31 from ~30 to a single piece. Furthermore, the heat shield 31 may not require a thermal blanket. The reduction in part count may result in a direct translation to cycle time reduction. Moreover, because the thermal blanket is eliminated, internal support structures for the thermal blanket, such as internal support gussets and stringers and other mounting hardware may be eliminated. The simple one-piece construction of the heat shield 31 may result in a weight reduction of 24 lbs. per airplane. The heat shield part count reduction and elimination of the thermal blanket may result in a reduction of total cost expenditure. As a secondary effect, there may be a significant cost reduction related to recurring and non-recurring dollars due to part count and part card reduction; engineering design, development, and testing; and manufacturing direct charging. Elimination of the thermal blanket may result in elimination of the need to perform sonic, thermal and fatigue testing which may otherwise be required for the thermal blanket.

Although the embodiments of this disclosure have been described with respect to certain exemplary embodiments, it is to be understood that the specific embodiments are for purposes of illustration and not limitation, as other variations will occur to those of skill in the art.

What is claimed is:
1. A heat shield, comprising:
a ceramic composite heat shield body comprising:
a pair of generally spaced-apart heat shield side panels;
a heat shield bottom panel extending between said heat shield side panels and having a heat exposure surface;
a heat shield top panel extending between said heat shield side panels in spaced-apart relationship with respect to said heat shield bottom panel and having at least one heat shield surface; wherein said at least one heat shield surface comprises at least one drain surface; and
at least one heat shield cavity defined between said heat shield bottom panel and said heat shield top panel.
2. The heat shield of claim 1 wherein said heat shield body comprises main body portion and a tapered body portion extending from said main body portion.
3. The heat shield of claim 1 further comprising a drain inlet opening provided in said heat shield top panel.
4. The heat shield of claim 1 further comprising a pair of upper flanges extending from said heat shield side panels, respectively, beyond said at least one heat shield surface of said heat shield top panel.
5. The heat shield of claim 1 further comprising a pair of side flanges extending from said heat shield side panels, respectively.
6. The heat shield of claim 1 wherein said at least one heat shield cavity comprises a pair of heat shield cavities.
7. The heat shield of claim 1 wherein said heat exposure surface of said heat shield bottom panel has a generally concave shape.
8. A heat shield, comprising:
a ceramic composite heat shield body comprising:
a pair of generally spaced-apart heat shield side panels;
a heat shield bottom panel extending between said heat shield side panels and having a heat exposure surface;
a heat shield top panel extending between said heat shield side panels in spaced-apart relationship with respect to said heat shield bottom panel and having a pair of generally sloped top panel sections, a top panel center line extending between said top panel sections and a pair of heat shield surfaces provided on said top panel sections, respectively; and
at least one heat shield cavity defined between said heat shield bottom panel and said heat shield top panel.
9. The heat shield of claim 8 wherein said heat shield body has a generally elongated, conical shape.
10. The heat shield of claim 8 wherein said heat shield body comprises main body portion and a tapered body portion extending from said main body portion.

11. The heat shield of claim 8 further comprising a drain inlet opening provided in said heat shield top panel.

12. The heat shield of claim 8 further comprising a pair of upper flanges extending from said heat shield side panels, respectively, beyond said at least one heat shield surface of said heat shield top panel.

13. The heat shield of claim 8 further comprising a pair of side flanges extending from said heat shield side panels, respectively.

14. The heat shield of claim 8 wherein said at least one heat shield cavity comprises a pair of heat shield cavities.

15. The heat shield of claim 8 wherein said heat exposure surface of said heat shield bottom panel has a generally concave shape.

16. A heat shield, comprising:
  a ceramic composite heat shield body comprising:
    a pair of generally spaced-apart heat shield side panels;
    a heat shield bottom panel extending between said heat shield side panels and having a heat exposure surface;
    a heat shield top panel extending between said heat shield side panels in spaced-apart relationship with respect to said heat shield bottom panel and having at least one heat shield surface;
    at least one heat shield cavity defined between said heat shield bottom panel and said heat shield top panel;
    a drain inlet opening provided in said at least one heat shield surface of said heat shield top panel;
    a drain outlet opening provided in said heat shield bottom panel; and
    a drain conduit establishing communication between said drain inlet opening and said drain outlet opening.

17. The heat shield of claim 16 wherein said heat shield body has a generally elongated, conical shape.

18. The heat shield of claim 16 wherein said heat shield body comprises main body portion and a tapered body portion extending from said main body portion.

19. The heat shield of claim 16 wherein said heat exposure surface of said heat shield bottom panel has a generally concave shape.

20. A heat shield, comprising:
  a generally conically-shaped ceramic composite heat shield body comprising:
    a pair of generally spaced-apart heat shield side panels;
    a heat shield bottom panel extending between said heat shield side panels and having a heat exposure surface;
    a heat shield top panel extending between said heat shield side panels in spaced-apart relationship with respect to said heat shield bottom panel and having a pair of generally sloped top panel sections, a top panel center line extending between said top panel sections and a pair of heat shield surfaces provided on said top panel sections, respectively;
    a pair of side flanges extending from said heat shield side panels, respectively;
    a pair of upper flanges extending from said heat shield side panels, respectively, beyond said heat shield surfaces of said heat shield top panel;
    a heat shield partition extending between said heat shield side panels between said heat shield bottom panel and said heat shield top panel;
    a first heat shield cavity defined between said heat shield bottom panel and said heat shield partition;
    a second heat shield cavity defined between said heat shield top panel and said heat shield partition;
    a drain inlet opening provided in said heat shield surfaces of said heat shield top panel;
    a drain outlet opening provided in said heat shield bottom panel; and
    a drain conduit establishing communication between said drain inlet opening and said drain outlet opening.

21. A heat shield, comprising:
  a ceramic composite heat shield body comprising:
    a pair of generally spaced-apart heat shield side panels;
    a heat shield bottom panel extending between said heat shield side panels and having a heat exposure surface; wherein said heat exposure surface of said heat shield bottom panel has a generally concave shape;
    a heat shield top panel extending between said heat shield side panels in spaced-apart relationship with respect to said heat shield bottom panel and having at least one heat shield surface; and
    at least one heat shield cavity defined between said heat shield bottom panel and said heat shield top panel.

* * * * *